United States Patent
Yoshikawa

[11] 3,803,941
[45] Apr. 16, 1974

[54] BRAKE LEVER FOR A BICYCLE
[75] Inventor: Kunihiko Yoshikawa, Soka, Japan
[73] Assignee: Kabushiki Kaisha Yoshikawa Seisakusho, Tokyo, Japan
[22] Filed: Oct. 20, 1972
[21] Appl. No.: 300,408

[52] U.S. Cl. .................................. 74/523, 74/543
[51] Int. Cl. ........................ G05g 1/10, G05g 1/04
[58] Field of Search .......... 74/473 R, 473 SW, 488, 74/489, 523, 543; 16/121

[56] References Cited
UNITED STATES PATENTS
3,481,217  12/1969  Maeda .................................. 74/489
3,680,405  8/1972  Naumann et al. ................. 74/543 X
3,167,336  1/1965  Lewis ................................ 74/543 X Primary Examiner—Leonard H. Gerin
Assistant Examiner—Frank H. McKenzie, Jr.
Attorney, Agent, or Firm—Eric H. Waters

[57] ABSTRACT

A brake lever for a bicycle formed of an L-shaped lever having a shorter and a longer arm portion formed of a sheared-off flat plate section having been previously cold worked; the shorter arm portion being adapted for attachment to a bicycle bracket and to a brake-actuating wire, the longer arm portion having projections along one edge thereof; and plastic tube means providing a gripping surface encompassing the longer arm portion engaged by the projections.

3 Claims, 7 Drawing Figures

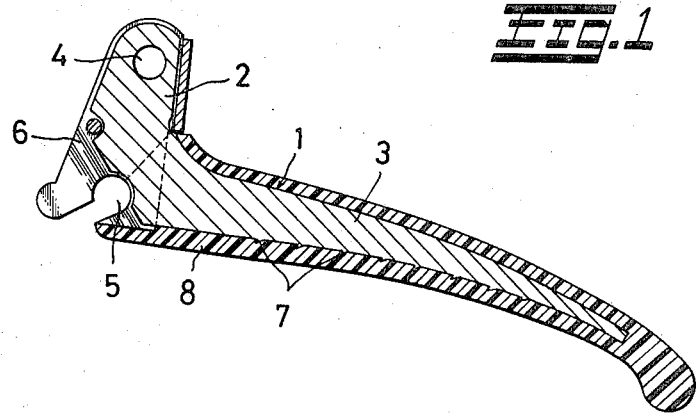
FIG.1
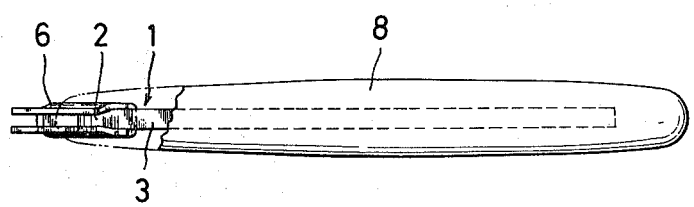
FIG.2
FIG.7
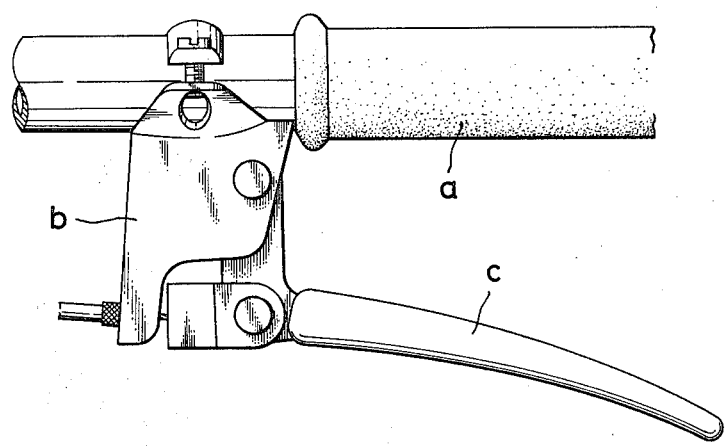

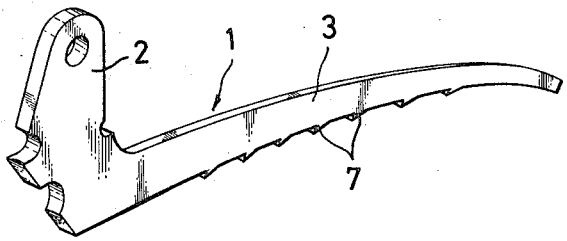
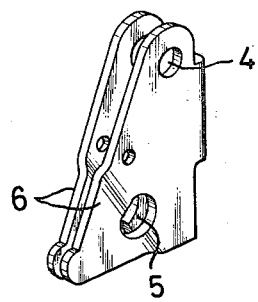

BRAKE LEVER FOR A BICYCLE

FIELD OF THE INVENTION

The present invention relates to a brake lever for a bicycle and, more particularly, a brake lever which is connected to a wire for manual braking operation.

Brake levers of this type are utilized wherein a generally L-shaped brake lever is pivotally supported at one end of a shorter arm portion thereof to a suitable bracket to the bicycle steering handle bar in proximity to the gripping portion thereof. At the bend or juncture of the arms of the brake lever, there is connected operating wire for actuation of the brake through manipulation of the lever.

DISCUSSION OF THE PRIOR ART

The brake lever usually has the shorter arm portion in the shape of a flat member to facilitate attachment thereof to the bicycle attachment bracket, whereas the longer arm portion is widened or expanded so as to provide for comfortable engagement by the fingers of the bicycle rider while concurrently having adequate bending strength. Heretofore, brake levers of the type described have been manufactured by rolling of rod-shaped material or through the bending of plate material into U-shape. This requires extensive tooling and is difficult to produce, so as to result in extremely high and uneconomical manufacturing costs.

SUMMARY OF THE INVENTION

The present invention greatly ameliorates and eliminates the disadvantages encountered in the prior art by forming of an L-shaped brake lever of the type described from a sheared section of metallic plate material which was previously cold worked, and in which the finger-engaging portion of the lever is covered with a suitable synthetic resinous plastic tubular material.

BRIEF DESCRIPTION OF THE DRAWINGS

These and other objects and advantages of the present invention will be more readily ascertained by reference to the following detailed description taken in conjunction with the accompanying drawings, in which:

FIG. 1 is a sectional side view of a first-embodiment of a bicycle brake lever according to the present invention;

FIG. 2 is a bottom plan view, partly removed, of the brake lever of FIG. 1;

FIG. 3 is an exploded perspective view of the main body portion of the brake lever of FIG. 1;

FIG. 7 is a side view showing a conventional brake lever mounted on a bicycle handle bar.

DETAILED DESCRIPTION

Figure 4:
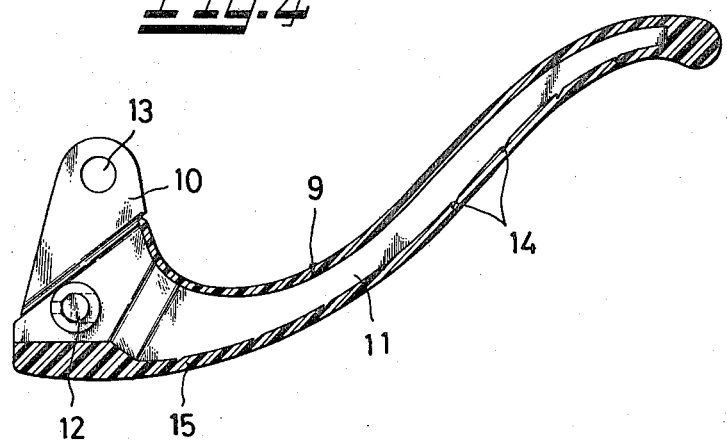
FIG. 4 is a sectional side view of a second embodiment of a bicycle brake lever according to the present invention.

Referring now in detail to the drawings, a bicycle brake lever of the type described is used in a manner that, as shown in FIG. 7, a substantially L-shaped brake lever member $c$ is pivotally supported at one end of a shorter arm portion thereof on an attaching bracket $b$ which is attached, in the vicinity of a hand grip portion, to a steering handle bar $a$ of a bicycle. The lever is connected at its bend to a brake actuating wire $d$. In the brake lever member 3 the shorter arm portion thereof is usually made flat so as to facilitate the attaching thereof to the bracket $b$, and the longer arm portion shaped to provide a comfortable gripping surface for the fingers of the bicycle rider.

In FIGS. 1 to 3, there is shown a brake lever of the flat or plate type. In this embodiment, a main body 1 for the brake lever is formed of a single flat L-shaped plate comprising a shorter arm portion 2 and a longer arm portion 3. The lever is formed by a sheared plate member formed by a punching operation of a plate material which has been previously subjected to cold working, such as cold rolling. The shorter arm portion 2 is provided at its free end with a pivotal opening 4 for attaching to a bicycle bracket. A thin, steel plate U-shaped attaching member or bracket 6 having an opening 5 for connecting with a brake actuation wire is secured to the shorter arm portion 2 so as to encompass the latter. The longer arm portion 3 of the lever is provided along its lower edge with a series of projections 7 forming gripping or slip-off preventing members for a synthetic resinous material tube 8 mounted or superimposed on the longer arm portion 3.

Figure 5:
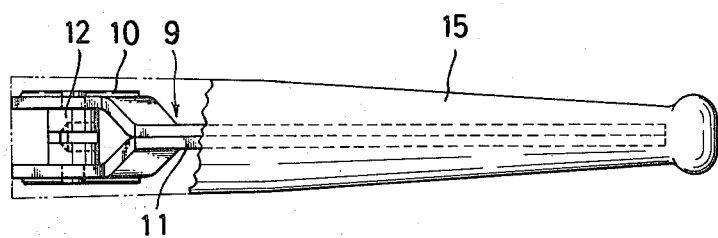
FIG. 5 is a bottom plan view, partly removed, of the brake lever of FIG. 4.
Figure 6:
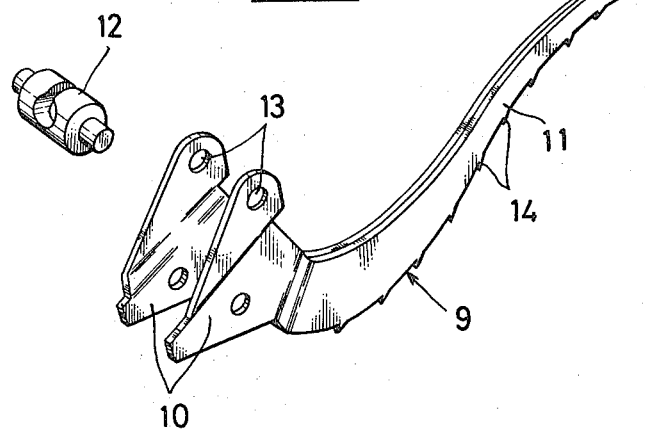
FIG. 6 is an exploded perspective view of the main body portion of the brake lever of FIG. 4.

In the embodiment of FIGS. 4 to 6 there is illustrated a brake lever of the covered or hooded type. In this embodiment, a main body 9 of the lever constructed of is a pair of L-shaped plates, each comprising a shorter arm portion 10 and a longer arm portion 11, and formed by a sheared section of a plate material which was previously subjected to cold working, are joined together by spot welding along their longer arm portions 11, 11 and are then bent outwardly at their end portions so that the shorter arm portions 10, 10 are in parallel facing position with one another defining a predetermined space therebetween. The shorter arm portions 10, 10 are provided at their lower ends adjacent the longer arm portions with a pin 12 extending through a suitable aperture, for connecting with a brake actuating wire (not shown), and at their upper or free ends with an opening 13 for pivotal attachment to a bicycle bracket. The longer arm portions 11, 11 are provided along their lower side edges with a series of claws 14 forming gripping or slip-off preventing members when engaged by, a synthetic resinous material tube 15 mounted on the arm portions 11, 11.

Thus, according to the present invention, the brake lever main body is formed by a sheared section of a plate material which has been previously subjected to cold working, so that a lever member having an extremely high bending strength is easily and economically manufactured. Additionally, the longer arm portion thereof is provided along one edge thereof with gripping or slip-off preventing projections, onto which a synthetic resinous material tube for finger-gripping is mounted, thereby the tube is securely fastened to the brake lever main body while concurrently providing an excellent finger engaging surface.

While there has been shown what is considered to be the preferred embodiment of the invention, it will be obvious that modifications may be made which come within the scope of the disclosure of the specification.

What is claimed is:

1. A brake lever for a bicycle; comprising a generally L-shaped lever body formed of a sheared section of metallic plate material previously subjected to cold working said lever body having a shorter arm portion joined to a longer arm portion, said lever body being a single L-shaped flat plate member; aperture means formed in said shorter arm portion adapted to provide for securing said lever to a bracket on said bicycle; projecting means formed along one edge of the longer arm of said lever; synthetic resinous plastic tube means mounted on said longer lever arm portion, said projecting means engaging said tube means so as to prevent slipping-off thereof from said longer arm portion; and an attaching member for actuating a brake-operating wire being fastened to the shorter arm portion of said brake lever, said attaching member comprising a U-shaped bracket.

2. A brake lever as claimed in claim 1, said lever body comprising a pair of parallel extending plate members, said plate members being welded together along their longer arm portions, said shorter arm portions having spaced apart parallel segments.

3. A brake lever as claimed in claim 2, comprising aligned aperture means formed in said spaced apart segments of said shorter arm portions; and pin means for actuating a brake-operating wire positioned between said segments being journalled in said aperture means.

* * * * *